US 9,641,329 B2

(12) United States Patent
Takahashi et al.

(10) Patent No.: US 9,641,329 B2
(45) Date of Patent: May 2, 2017

(54) IN-VEHICLE SYSTEM AND COMMUNICATION METHOD

(75) Inventors: Yasuyuki Takahashi, Okazaki (JP); Yuzo Harata, Chiryu (JP); Mitsuyoshi Natsume, Hekinan (JP)

(73) Assignee: DENSO CORPORATION, Kariya (JP)

( * ) Notice: Subject to any disclaimer, the term of this patent is extended or adjusted under 35 U.S.C. 154(b) by 817 days.

(21) Appl. No.: 13/609,950

(22) Filed: Sep. 11, 2012

(65) Prior Publication Data

US 2013/0173112 A1    Jul. 4, 2013

(30) Foreign Application Priority Data

Dec. 28, 2011    (JP) .................................. 2011-288060

(51) Int. Cl.
| | |
|---|---|
| *H04L 9/30* | (2006.01) |
| *H04L 9/08* | (2006.01) |
| *H04L 9/32* | (2006.01) |
| *H04W 12/04* | (2009.01) |
| *H04L 29/06* | (2006.01) |
| *H04L 29/08* | (2006.01) |

(52) U.S. Cl.
CPC ............ *H04L 9/0894* (2013.01); *H04L 9/321* (2013.01); *H04W 12/04* (2013.01); *H04L 63/0823* (2013.01); *H04L 67/12* (2013.01); *H04L 2209/84* (2013.01)

(58) Field of Classification Search
CPC .................................................. H04L 9/0894
USPC ........................................................ 701/36
See application file for complete search history.

(56) References Cited

U.S. PATENT DOCUMENTS

| | | | |
|---|---|---|---|
| 2004/0078119 A1* | 4/2004 | Luitje ....................... G06F 8/60 | 701/1 |
| 2004/0168663 A1* | 9/2004 | Matsuura et al. ......... 123/179.2 | |
| 2004/0210757 A1* | 10/2004 | Kogan et al. ................. 713/182 | |
| 2005/0222718 A1* | 10/2005 | Lazarz .................... G06F 21/34 | 701/1 |
| 2007/0030844 A1* | 2/2007 | Fukuta ................ G07B 15/063 | 370/359 |
| 2008/0214022 A1* | 9/2008 | Kowalick .......... H01R 13/6397 | 439/34 |
| 2008/0232583 A1* | 9/2008 | Di Crescenzo et al. ........ 380/44 | |

(Continued)

FOREIGN PATENT DOCUMENTS

JP    A-2009-081755    4/2009

*Primary Examiner* — Michael McCullough
*Assistant Examiner* — Michael E Butler
(74) *Attorney, Agent, or Firm* — Posz Law Group, PLC

(57) ABSTRACT

An in-vehicle system for communicating with an external tool for storing a tool secret key includes: a communication device; a tool key acquisition device; and a communication controller. The in-vehicle system and an external server for storing external tool information provide a vehicular communication system. The external tool information provides a tool public key and key identification information. The tool public key pairs with the tool secret key. When the external tool requests communication connection with the in-vehicle system, the tool key acquisition device transmits the key identification information to the external server, so that the tool key acquisition device acquires the tool public key from the external server. The communication controller performs cryptographic communication with the external tool using the tool public key.

14 Claims, 6 Drawing Sheets

(56) References Cited

U.S. PATENT DOCUMENTS

| | | | |
|---|---|---|---|
| 2008/0232595 A1* | 9/2008 | Pietrowicz et al. | 380/277 |
| 2009/0240392 A1* | 9/2009 | Yamashita | H03M 7/46 701/31.4 |
| 2010/0205450 A1* | 8/2010 | Sarnacke | G07C 5/0808 713/185 |
| 2011/0112969 A1* | 5/2011 | Zaid et al. | 705/50 |
| 2012/0169282 A1* | 7/2012 | Helnerus et al. | 320/109 |
| 2012/0320927 A1* | 12/2012 | Katou | H04L 12/66 370/401 |
| 2013/0099892 A1* | 4/2013 | Tucker et al. | 340/5.61 |
| 2013/0159717 A1* | 6/2013 | Rabadi et al. | 713/176 |

* cited by examiner

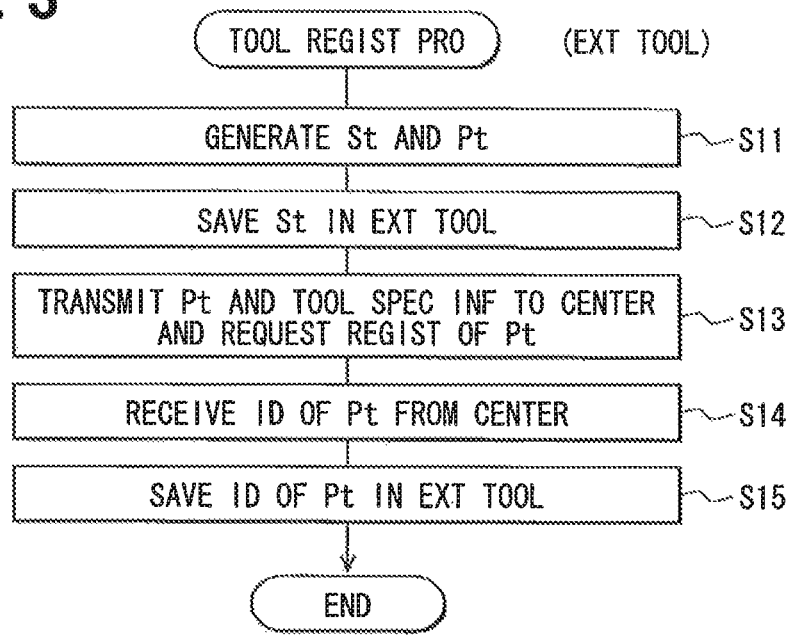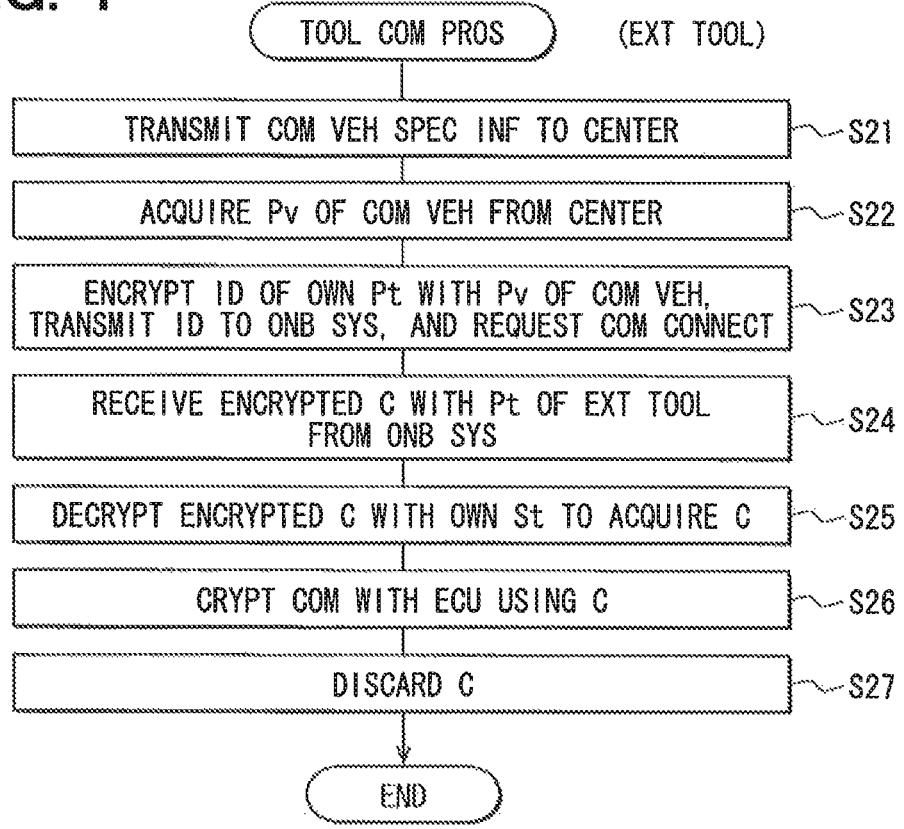

IN-VEHICLE SYSTEM AND COMMUNICATION METHOD

CROSS REFERENCE TO RELATED APPLICATION

This application is based on Japanese Patent Application No. 2011-288060 filed on Dec. 28, 2011, the disclosure of which is incorporated herein by reference.

TECHNICAL FIELD

The present disclosure relates to a technology of encrypted communication between an in-vehicle system and an external tool.

BACKGROUND

Recently, as vehicles are electronically controlled, electronic components control various vehicle components such as an engine and a brake. There is an increasing number of electronic control units (ECUs) connected to the electronic components. The ECUs can cooperate and share information with each other and therefore can provide a network (onboard system). The onboard system (in-vehicle system) is connected to an external tool through a connector. Using the external tool, the onboard system can diagnose vehicle states through the ECU or rewrite (reprogram) a program stored in the ECU.

There is a known technology (see patent document 1) that encrypts transmission data in order to improve the security of information to be transmitted. Cryptographic communication between the external tool and the onboard system may prevent an improper access to communication data.

The above-mentioned onboard system may be subject to an improper access (e.g., improper tampering with the ECU program) using an improper external tool.

Patent Document 1: JP-A-2009-81755

SUMMARY

It is an object of the present disclosure to provide a technology that prevents an improper external tool from communicating with a vehicular system.

According to a first aspect of the present disclosure, an in-vehicle system for communicating with an external tool includes: a communication device; a tool key acquisition device, and a communication controller. The in-vehicle system and an external server provide a vehicular communication system. The external tool stores a tool secret key. The external server stores external tool information. The external tool information provides a tool public key and key identification information, which are associated with each other. The tool public key provides a public key, which pairs with the tool secret key. The key identification information provides identification information about the tool public key. The communication device communicates with the server. When the external tool requests communication connection with the in-vehicle system, the tool key acquisition device transmits the key identification information corresponding to the external tool as a request source to the server via the communication device, so that the tool key acquisition device acquires the tool public key associated with the key identification information from the server via the communication device. The communication controller performs cryptographic communication with the external tool as the request source with using the tool public key acquired by the tool key acquisition device.

The above in-vehicle system performs cryptographic communication with the external tool using the tool public key stored (registered) in the server. An external tool used for the cryptographic communication can be limited to the external tool that stores the tool secret key paired with the tool public key. For example, an external tool may improperly access identification information about the tool public key stored (registered) in the server that does not store (register) the tool public key of the external tool. Even in such a case, a failure to acquire the tool secret key disables the cryptographic communication using the tool public key. Only the authenticated external tool can register its tool public key to the server and prevent an unauthenticated external tool from making communication connection with the in-vehicle system.

According to a second aspect of the present disclosure, a method for communicating between an in-vehicle system and an external tool includes: transmitting key identification information from the external tool to the in-vehicle system, wherein the key identification information provides identification information about a tool public key of the external tool; transmitting the key identification information from the in-vehicle system to a server, wherein the server stores the tool public key and key identification information about the tool public key, which are associated with each other; transmitting the tool public key from the server to the in-vehicle system, wherein the tool public key is associated with the key identification information received by the server; transmitting a common key from the in-vehicle system to the external tool, wherein the common key is encrypted using the tool public key received by the in-vehicle system; decrypting an encrypted common key received by the external tool using a tool secret key, which pairs with the tool public key of the external tool; and performing cryptographic communication with the in-vehicle system using the common key.

In the above method, the tool public key stored (registered) in the server is used to encrypt the common key. The in-vehicle system transmits the common key to the external tool to share the common key. The in-vehicle system may perform cryptographic communication using the common key with the external tool. In such a case, the in-vehicle system can limit the targeted external tool to the one that stores a tool secret key paired with the tool public key. For example, an external tool may improperly access identification information about the tool public key stored (registered) in the server that does not store (register) the tool public key of the external tool. Even in such a case, a failure to acquire the tool secret key disables the cryptographic communication (decrypting the encrypted common key) using the tool public key. Cryptographic communication using the common key is unavailable. Only the authenticated external tool can register its tool public key to the server and prevent an unauthenticated external tool from making communication connection with the in-vehicle system. After the common key is shared, the vehicular communication system can perform cryptographic communication based on the common key encryption system with a decreased processing load instead of cryptographic communication based on the public key encryption system.

BRIEF DESCRIPTION OF THE DRAWINGS

The above and other objects, features and advantages of the present disclosure will become more apparent from the following detailed description made with reference to the accompanying drawings. In the drawings:

FIG. 3 is a flowchart showing a tool registration process performed by an external tool controller;

FIG. 4 is a flowchart showing a tool communication process performed by the external tool controller;

DETAILED DESCRIPTION

Embodiments of the present disclosure will be described in further detail with reference to the accompanying drawings.

1. Overall Configuration

Figure 1:
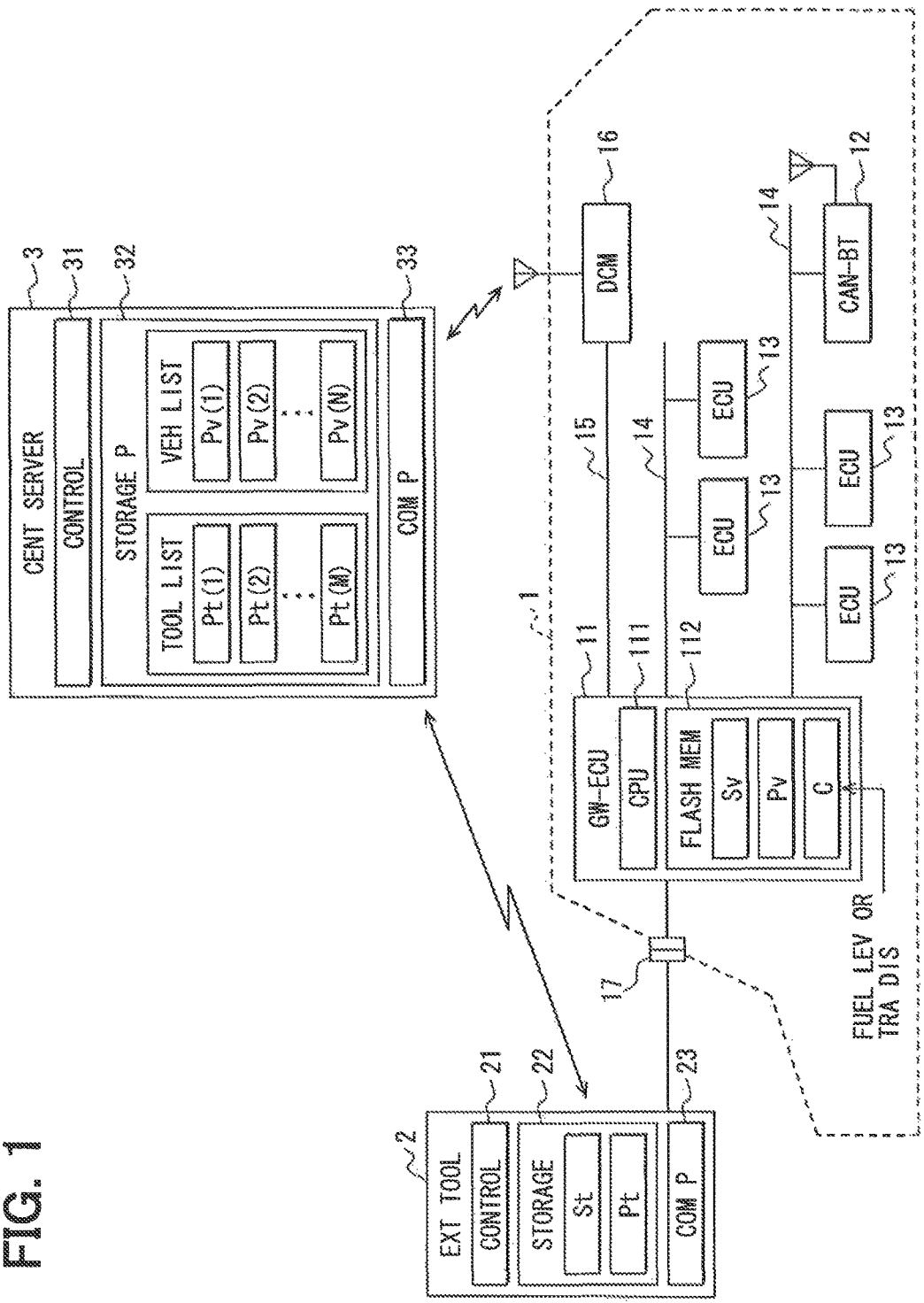
FIG. 1 is a block diagram showing a vehicular communication system according to an embodiment.

FIG. 1 is a block diagram showing a vehicular communication system according to an embodiment.

The vehicular communication system includes an onboard system (i.e., in-vehicle system) 1, an external tool 2, and a center (server) 3. The onboard system 1 is mounted on a vehicle. The external tool 2 is used for communication with the onboard system 1. The center 3 stores or manages information about more than one vehicle (onboard system 1) and information about more than one external tool 2.

The onboard system 1 includes more than one electronic control unit (ECU) provided for portions in the vehicle. The ECUs include a gateway ECU (GW-ECU) 11, a CAN-BT-ECU 12, and the other ECUs 13 having various functions. The GW-ECU 11, the CAN-BT-ECU 12, and the other ECUs 13 are connected with a bus 14 as a shared communication line (multiplex communication line) to configure an in-vehicle LAN. The ECUs communicate with each other in compliance with the CAN (Controller Area Network) protocol through the bus 14. The onboard system 1 also includes an onboard wireless device 16 equivalent to a Data Communication Module (DCM) connected through the GW-ECU 11 and a dedicated communication line 15. In the present embodiments, although the ECUs communicate with each other in compliance with the CAN protocol, the ECUs may communicate with each other in compliance with another protocol.

The GW-ECU 11 is provided between the bus 14 and a data link connector (hereinafter referred to simply as a connector) 17 that connects the external tool 2 from outside the vehicle. In other words, the GW-ECU 11 is provided for a communication path that connects the external tool 2 and the ECU 13. In the onboard system 1, the GW-ECU 11 directly communicates with the external tool 2. The ECU 13 communicates with the external tool 2 through the GW-ECU 11. That is, the external tool 2 is connected to the ECU 13 through the GW-ECU 11, not directly thereto. The GW-ECU 11 functions as a repeating device that enables communication between the external tool 2 and the ECU 13.

Specifically, the GW-ECU 11 includes a CPU 111 and flash memory 112, i.e., nonvolatile memory that can electrically rewrite the stored contents. The flash memory 112 stores a secret key Sv, a public key Pv, and a common key C as key data for the onboard system 1. The public key Pv pairs with the secret key Sv. The common key C is used for cryptographic communication based on a common key encryption system in the vehicle. The secret key Sv is managed as secret information. As will be described later, the public key Pv is stored in the center 3 and is managed so as to be supplied to the external tool 2. The common key C is also stored in the CAN-BT-ECU 12 and the other ECUs 13 and is used to encrypt transmission data and decrypt reception data.

The CAN-BT-ECU 12 has two functions. One performs communication in compliance with the CAN protocol through the bus 14. The other performs near field communication in compliance with the Bluetooth (registered trademark) standard. As described above, the CAN-BT-ECU 12 stores the same common key C as that for the GW-ECU 11.

Each ECU 13 stores a software program that implements various functions. As described above, each ECU 13 stores the same common key C as that for the GW-ECU 11.

The onboard wireless device 16 performs communication using mobile telephone networks and Internet communication networks and provides wide-area wireless communication using local mobile telephone base stations. The onboard system 1 includes the onboard wireless device 16 and thereby enables far-field wireless communication with the center 3.

While connected with the connector 17, the external tool 2 diagnoses vehicle states through the ECU 13 installed in the vehicle, reads data, controls controller parts based on the function of the ECU 13, and rewrites or reprograms a program stored in the ECU 13.

Specifically, the external tool 2 includes a controller 21, a storage portion 22, and a communication portion 23. The storage portion 22 stores a secret key St and a public key Pt paired with the secret key St as key data for the external tool 2. The secret key St is managed as secret information. As will be described later, the public key Pt is stored in the center 3 and is managed so as to be supplied to the onboard system 1. The communication portion 23 has two functions. One performs wired communication with the GW-ECU 11 of the onboard system 1 through the connector 17. The other performs wireless communication with the center 3 using mobile telephone networks and Internet communication networks.

The center 3 is equivalent to a server under management of an organization such as a vehicle manufacturer or a state institute that manages connection of the external tool 2 with the onboard system 1. The center 3 stores or manages the public key Pv of the onboard system 1 and the public key Pt of the external tool 2.

Specifically, the center 3 includes a controller 31, a storage portion 32, and a communication portion 33. The storage portion 32 stores a tool list and a vehicle list. The tool list manages public keys Pt(1), Pt(2), ..., and Pt(M) for more than one external tool 2. The vehicle list manages public keys Pv(1), Pv(2), ..., and Pv(N) for more than one onboard system 1. The tool list stores the public key Pt associated with tool specification information. The tool specification information specifies ID (key identification information) for the public key Pt and the external tool 2. For example, the tool specification information includes a serial number of the tool itself and user information such as his or her name, birth date, address, and telephone number. Similarly, the vehicle list stores the public key Pv associated with vehicle specification information that specifies the vehicle (onboard system 1). For example, the vehicle specification information includes a license number and a serial number of the vehicle. The communication portion 33 performs wireless communication with the onboard system 1 and the external tool 2 using mobile telephone networks and Internet communication networks.

2. Overview of Processes

Figure 2:
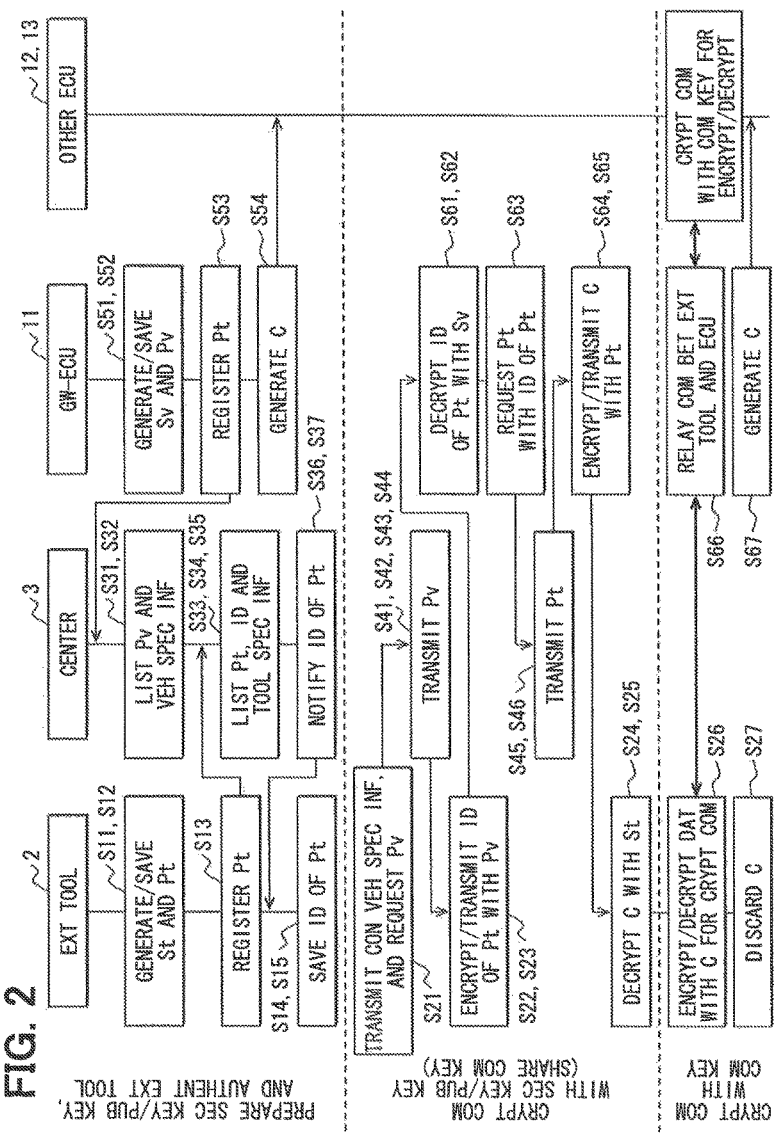
FIG. 2 is a flowchart showing a process performed by the vehicular communication system.

With reference to FIG. 2, the following describes process flows (communication method) performed by the vehicular communication system according to the embodiment. Step numbers S11, S12, and so on shown in FIG. 2 correspond to those used for flowcharts shown in FIGS. 3 through 8.

(1) Preparing the Secret Key and the Public Key and Authenticating the External Tool In the onboard system 1, the GW-ECU 11 generates the secret key Sv and the public key Pv in accordance with the public key encryption system predetermined in the vehicular communication system according to the embodiment and stores the generated secret keys in its storage portion (flash memory 112) (S51 and S52). A known encryption system (e.g., RSA) can be used as the public key encryption system.

The GW-ECU 11 transmits the generated public key Pv and the vehicle specification information to the center 3 and requests registration of the public key Pv (S53). The center 3 associates the public key Pv with the vehicle specification information received from the onboard system 1 and registers or stores them in the vehicle list (S31 and S32). The center 3 may store the public key Pv before factory shipment of vehicles. In such a case, the public key Pv may be registered or updated after factory shipment in accordance with ECU replacement or a change made by a user.

In the onboard system 1, the GW-ECU 11 generates the common key C and transmits the generated common key C to the other ECUs (CAN-BT-ECU 12 and ECU 13) in the vehicle (S54). The ECUs (GW-ECU 11, CAN-BT-ECU 12, and ECU 13) included in the onboard system 1 share the common key C and perform cryptographic communication according to the common key encryption system using the common key C.

The external tool 2 also generates the secret key St and the public key Pt in accordance with the same public key encryption system as for the GW-ECU 11 and stores the generated secret keys in its storage portion 22 (S11 and S12). The external tool 2 transmits the generated public key Pt and the tool specification information to the center 3 and requests registration of the public key Pt (S13).

The center 3 generates an ID for the public key Pt received from the external tool 2 and registers or stores the public key Pt, the ID, and the tool specification information associated with each other in the tool list (S33 through S35) and notifies the public key Pt ID to the external tool 2 (S36 and S37). The external tool 2 receives the public key Pt ID from the center 3 and saves the ID in its storage portion 22 (S14 and S15). At this stage, the center authenticates the external tool 2 (authenticated tool).

(2) Cryptographic Communication Using the Secret Key and the Public Key (Sharing the Common Key)

The authenticated external tool 2 has acquired the public key Pt ID from the center 3. To connect with the vehicle (onboard system 1) for communication, the external tool 2 transmits the vehicle specification information about the vehicle for connection to the center 3 and requests the public key Pv about the vehicle (S21). The center 3 receives the vehicle specification information from the external tool 2 and then transmits the public key Pv about the vehicle for connection to the external tool 2 (S41 through S44). The vehicle list stores the public key Pv in association with the vehicle specification information. The external tool 2 receives the public key Pv about the vehicle for connection. The external tool 2 then encrypts its public key Pt ID using the public key Pv and transmits the public key Pt ID to the GW-ECU 11 through the connector 17 to request the communication connection (S22 and S23).

The GW-ECU 11 receives the encryption data (encrypted ID) in response to the communication connection request from the external tool 2. The GW-ECU 11 decrypts the received encryption data using its secret key Sv to acquire the public key Pt ID for the requesting external tool 2 (S61 and S62). The GW-ECU 11 transmits the ID to the center 3 and requests the public key Pt associated with the ID, that is, the public key Pt for the external tool 2 (S63). The center 3 receives the public key Pt associated with the ID from the onboard system 1 and transmits the public key Pt to the onboard system 1 (S45 and S46). The GW-ECU 11 receives or acquires the public key Pt from the center 3 and encrypts the common key C using the public key Pt. Using the connector 17, the GW-ECU 11 transmits the common key C to the external tool 2 that requested the communication connection (S64 and S65). In other words, the onboard system 1 performs cryptographic communication with the external tool 2 according to the public key encryption system using the public key Pt. The external tool 2 receives the encryption data (encrypted common key C) from the GW-ECU 11 and decrypts the encryption data using its secret key St to acquire the common key C (S24 and S25).

(3) Cryptographic Communication Using the Common Key C

After acquiring the common key C, the external tool 2 uses it to encrypt data to be transmitted to the ECU 13 and transmits the data to the GW-ECU 11 (S26). The GW-ECU 11 receives the encrypted data from the external tool 2 and directly transmits or relays it to the ECU 13 (S66). The ECU 13 receives the encrypted data from the GW-ECU 11 and decrypts the data using the common key C. The ECU 13 similarly transmits data to the external tool 2. The ECU 13 encrypts data to be transmitted using the common key C and transmits the encrypted data. The external tool 2 decrypts the received data using the common key C (S26). The external tool 2 and the ECU 13 perform cryptographic communication via the GW-ECU 11 according to the common key encryption system using the common key C.

After completion of the communication between the external tool 2 and the ECU 13, the GW-ECU 11 generates a new common key C and transmits the generated common key C to the other ECUs (CAN-BT-ECU 12 and ECU 13) in the vehicle to update the common key C and deletes the old common key C (S67). The subsequent cryptographic communication uses the new common key C not provided for the external tool 2. The external tool 2 deletes the used common key C (S27).

3. Specific Process Procedures

The following describes specific process procedures performed in the onboard system 1 (GW-ECU 11), the external tool 2, and the center 3.

(1) Process Performed in the External Tool 2

FIG. 3 is a flowchart showing a tool registration process performed by the controller 21 of the external tool 2 so that the center 3 can authenticate the external tool 2.

The controller 21 generates the secret key St and the public key Pt in accordance with a predetermined public key encryption system (S11). The controller 21 saves the generated secret key St in the storage portion 22 of the external tool 2 (S12). The controller 21 transmits the tool specification information about the generated public key Pt and the external tool 2 to the center 3 and requests their registration (S13). The order of steps S12 and S13 is not limited thereto and may be reversed.

The controller 21 receives the public key Pt ID from the center (S14), saves the received ID in the storage portion 22 of the external tool 2 (S15), and terminates the tool registration process in FIG. 3. According to the tool registration process, the center 3 authenticates the external tool 2.

FIG. 4 is a flowchart showing a tool communication process performed by the controller 21 of the external tool 2 so that the external tool 2 communicates with the ECU 13 mounted on a vehicle to diagnose vehicle states or rewrite a program.

The controller 21 transmits the vehicle specification information about a vehicle for communication to the center 3 (S21). The controller 21 receives the public key Pv about the vehicle for communication from the center 3 (S22). The controller 21 encrypts its public key Pt ID using the public key Pv acquired from the center 3, that is, the public key Pv about the vehicle for communication. The controller 21 transmits, the ID to the GW-ECU 11 of the onboard system 1 via the connector 17 to request the communication connection (S23). The controller 21 receives the common key C from the GW-ECU 11 of the onboard system 1 (S24). The public key Pt of the external tool 2 is used to encrypt the common key C. The controller 21 decrypts the common key C using its secret key St to acquire the common key C (S25).

The controller 21 performs cryptographic communication with the ECU 13 using the common key C (S26). Specifically, the controller 21 uses the common key C to encrypt data to be transmitted to the ECU 13 and transmits the data to the ECU 13 via the GW-ECU 11. The controller 21 uses the common key C to decrypt the encryption data received from the ECU 13 via the GW-ECU 11. After completing the communication with the ECU 13, the controller 21 discards the common key C (S27) and terminates the tool communication process in FIG. 4.

(2) Process Performed in the Center 3

Figure 5:
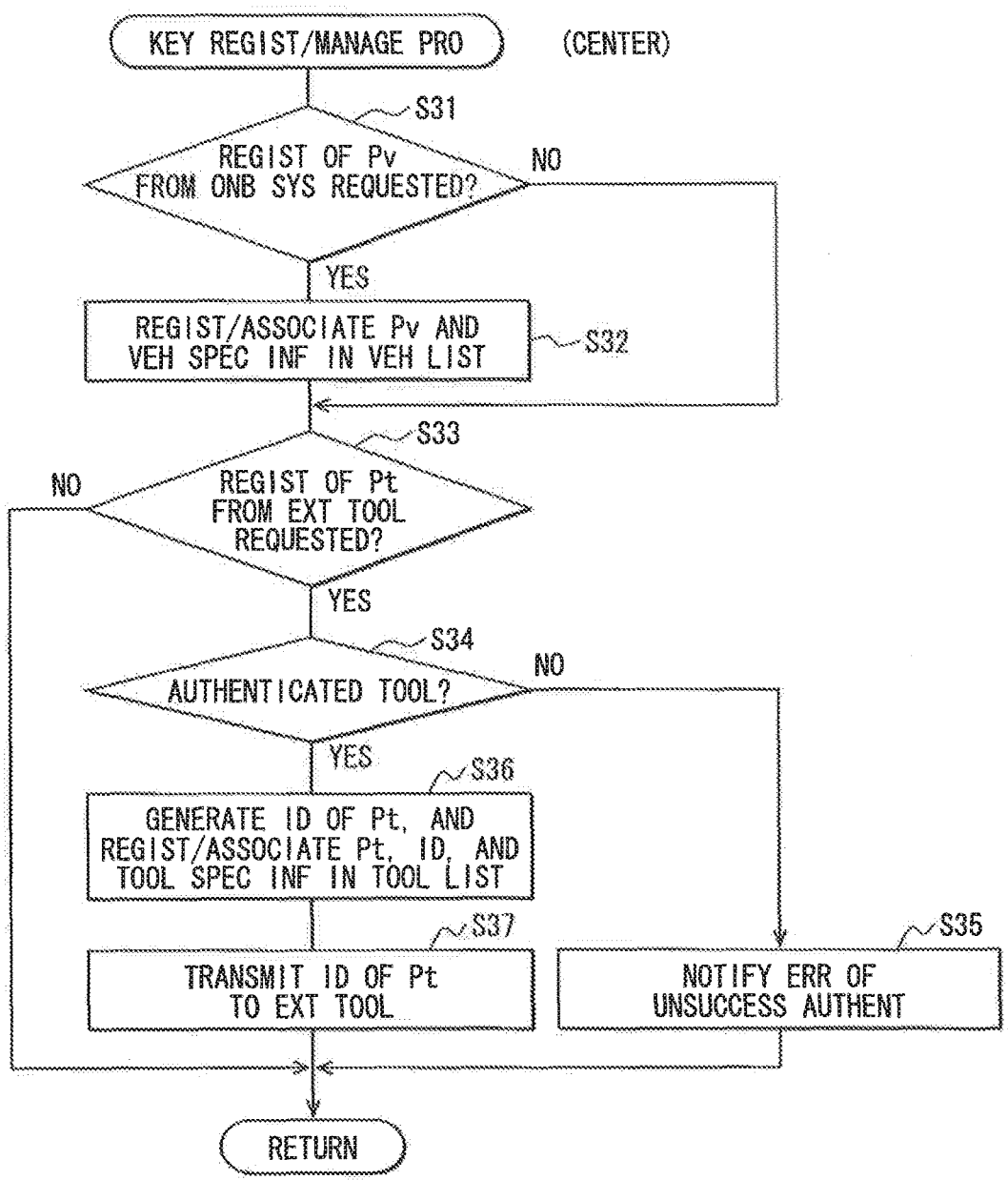
FIG. 5 is a flowchart showing a key registration/management process performed by a center controller.

FIG. 5 is a flowchart showing key registration/management process performed by the controller 31 of the center 3 to manage the public key Pv of the onboard system 1 and the public key Pt of the external tool 2.

The controller 31 determines whether the onboard system 1 requests registration of the public key Pv (S31). If registration of the public key Pv is requested (YES at S31), the controller 31 registers (manages) the public key Pv and the vehicle specification information received from the onboard system 1 to the vehicle list in association with each other (S32).

The controller 31 determines whether the external tool 2 requests registration of the public key Pt (S33). If registration of the public key Pt is requested (YES at S33), the controller 31 uses the tool specification information received from the external tool 2 to determine whether the requesting external tool 2 is authenticated (S34). Specifically, for example, the controller 31 determines whether the serial number contained in the tool specification information received from the external tool 2 corresponds to the serial number of the authenticated tool specified in a vehicle manufacturer.

If the requesting external tool 2 is not authenticated (NO at S34), the controller 31 notifies the requesting external tool 2 of an error indicating that the authentication fails (S35). If the requesting external tool 2 is authenticated (YES at S34), the controller 31 generates an ID for the public key Pt received from the external tool 2 and registers (manages) the public key Pt, the ID, and the tool specification information to the tool list in association with each other (S36). The controller 31 transmits the public key Pt ID to the external tool 2 (S37). The key registration/management process in FIG. 5 repeats the above-mentioned steps S31 through S37.

Figure 6:
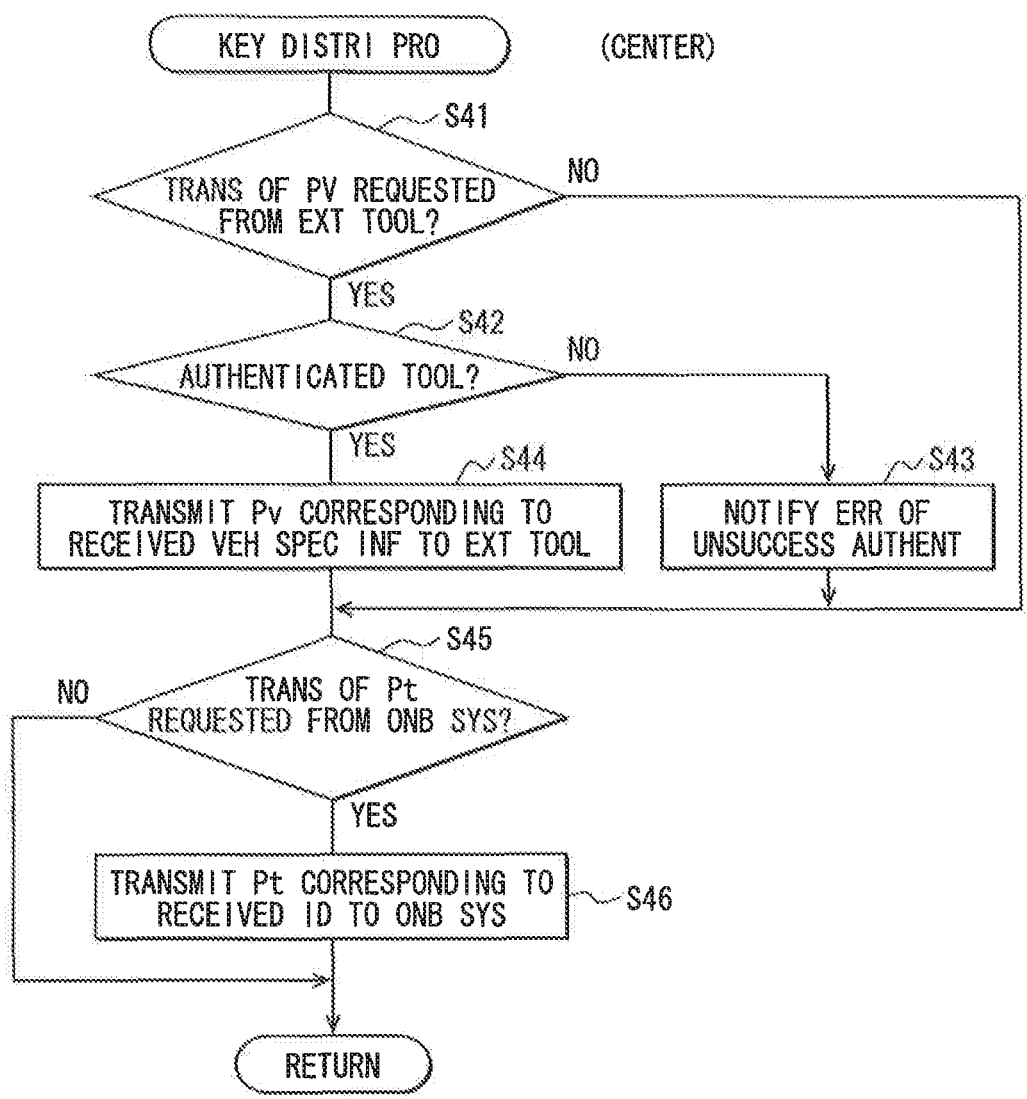
FIG. 6 is a flowchart showing a key distribution process performed by the center controller.

FIG. 6 is a flowchart showing a key distribution process performed by the controller 31 of the center 3 in order to distribute the public key Pv of the onboard system 1 and the public key Pt of the external tool 2 to the outside (onboard system 1 or external tool 2).

The controller 31 determines whether the external tool 2 requests transmission of the public key Pv in the onboard system 1 (S41). If transmission of the public key Pv is requested (YES at S41), the controller 31 uses the ID received from the external tool 2 to determine whether the transmitting external tool 2 is authenticated, that is, whether the center 3 registers the ID of the external tool 2 (S42). If the transmitting external tool 2 is not authenticated (NO at S42), the controller 31 notifies the transmitting external tool 2 of an error indicating that the authentication fails (S43). If the transmitting external tool 2 is authenticated (YES at S42), the controller 31 transmits the public key Pv to the requesting external tool 2 (S44). The public key Pv is associated with the vehicle specification information received from the external tool 2.

The controller 31 determines whether the onboard system 1 requests transmission of the public key Pt in the external tool 2 (S45). If transmission of the public key Pt is requested (YES at S45), the controller 31 transmits the public key Pt associated with the ID received from the onboard system 1 to the requesting onboard system 1 (S46). The key distribution process in FIG. 6 repeats the above-mentioned steps S41 through S46.

(3) Process Performed in the Onboard System 1 (GW-ECU 11)

Figure 7:
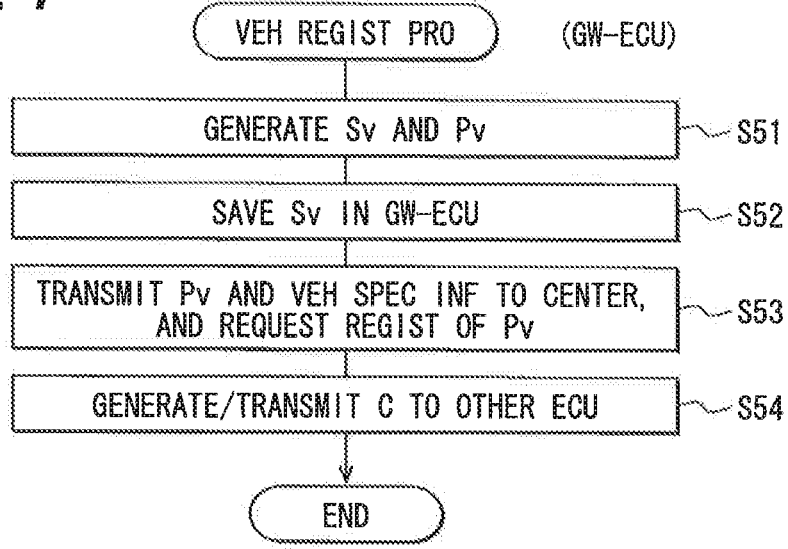
FIG. 7 is a flowchart showing a vehicle registration process performed by a GW-ECU CPU.

FIG. 7 is a flowchart showing a vehicle registration process performed by the CPU 111 of the GW-ECU 11 in order to register the public key Pv of the onboard system 1 to the center 3.

The CPU 111 generates the secret key Sv and the public key Pv in accordance with the predetermined public key encryption system (S51). The CPU 111 saves the generated secret key Sv in the flash memory 112 of the GW-ECU 11 (S52). The CPU 111 transmits the generated public key Pv and the vehicle specification information about the vehicle (onboard system 1) to the center 3 and requests the registration (S53). The order of steps S52 and S53 is not limited thereto and may be reversed.

The CPU 111 generates the common key C and transmits the generated common key C to the other ECUs (CAN-BT-ECU 12 and ECU 13) in the vehicle (S54). The CPU 111 then terminates the vehicle registration process in FIG. 7.

Figure 8:
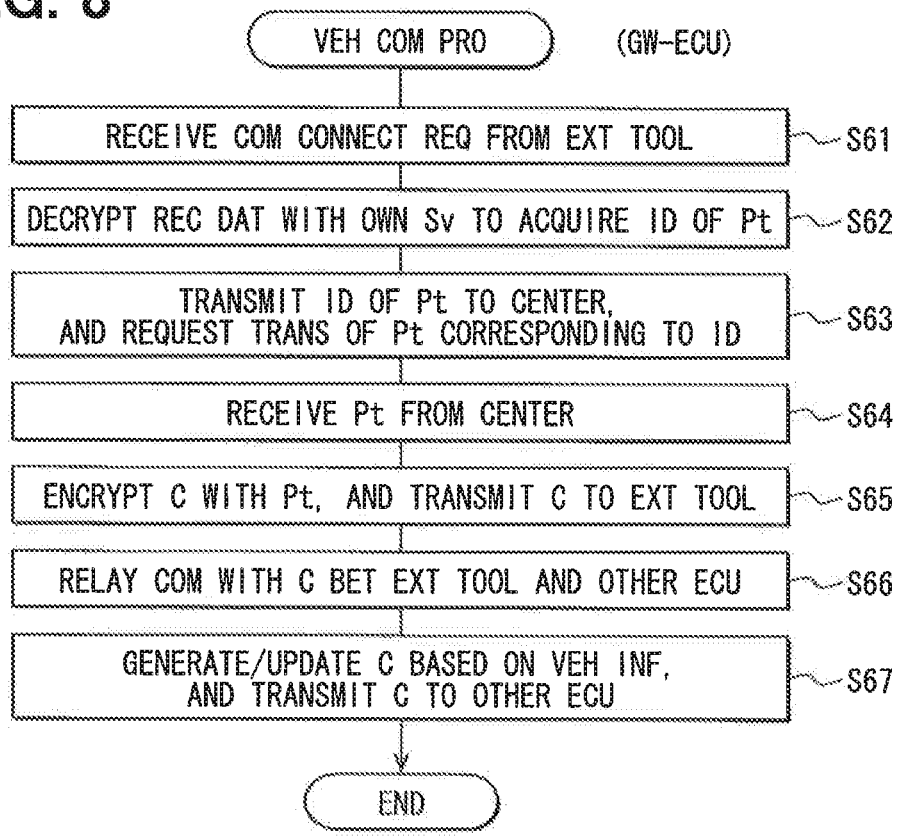
FIG. 8 is a flowchart showing a vehicle communication process performed by the GW-ECU CPU.

FIG. 8 is a flowchart showing a vehicle communication process performed by the CPU 111 of the GW-ECU 11 in order to relay communication between the external tool 2 connected with the connector 17 and the ECU 13.

The CPU 111 receives a request for communication connection from the external tool 2 (S61). The CPU 111 receives encryption data from the external tool 2. The encryption data represents the ID of the public key Pt for the external tool 2 and is encrypted using the public key Pv of the onboard system 1. The CPU 111 uses its secret key Sv to decrypt the encryption data to acquire the public key Pt ID (S62). The CPU 111 transmits the public key Pt ID to the center 3 and requests transmission of the public key Pt associated with the ID, that is, the public key Pt for the external tool 2 that requested the communication connection (S63). The CPU 111 receives the public key Pt from the center 3 (S64). The CPU 111 uses the public key Pt to decrypt the common key C and transmits it to the external tool 2 (S65).

The CPU 111 relays the communication using the common key C between the external tool 2 and the ECU 13 (S66). After completion of the communication between the external tool 2 and the ECU 13, the CPU 111 generates a new common key C to update the common key C (S67). The common key C is generated based on the vehicle information with varying values such as the fuel level, the travel distance, and the engine speed. The CPU 111 transmits the generated common key C to the other ECUs (CAN-BT-ECU 12 and ECU 13) in the vehicle to update the common key C (S67). The CPU 111 then terminates the vehicle communication process in FIG. 8.

4. Effects

In the vehicular communication system according to the embodiment as described above, the onboard system 1 (GW-ECU 11) uses the public key Pt registered to the center 3 to perform cryptographic communication with the external tool 2. Specifically, the onboard system 1 (GW-ECU 11) encrypts common key C using the public key Pt and transmits the common key C to the external tool 2 to share the common key C. The onboard system 1 (GW-ECU 11) can limit the external tool 2 for cryptographic communication using the public key Pt and using the common key C to the external tool 2 that stores the secret key St paired with the public key Pt.

Suppose an improper access to the public key Pt ID registered to the center 3 if the public key Pt of the external tool 2 is not registered to the center 3. In such a case, a failure to acquire the secret key St disables the cryptographic communication using the public key Pt (decryption of the encrypted common key C) and also disables the cryptographic communication using the common key C. Only the authenticated external tool 2 is permitted to register the public key Pt to the center 3 and thereby prevent an improper external tool from making communication connection to the onboard system 1.

After the common key C is shared, the vehicular communication system performs cryptographic communication based on the common key encryption system with a decreased processing load instead of cryptographic communication based on the public key encryption system. The vehicular communication system can decrease a processing load on the onboard system 1.

The onboard system 1 (GW-ECU 11) updates the common key C (S67) each time the onboard system 1 completes cryptographic communication with the external tool 2 based on the common key encryption system. A different common key C is used each time the onboard system 1 performs cryptographic communication with the external tool 2 based on the common key encryption system. The vehicular communication system can provide higher security than a configuration that does not update the common key C. The onboard system 1 generates the updated common key C based on the vehicle information. The onboard system 1 can vary the common key C according to the vehicle information in a hardly predictable manner.

In the onboard system 1, the GW-ECU 11 directly communicates with the external tool 2. The external tool 2 may request the onboard system 1 to make communication connection with the ECU 13. In such a case, the GW-ECU 11 acquires the public key Pt of the requesting external tool 2 from the center 3 (S63 and S64). The onboard system 1 performs cryptographic communication using the public key Pt (S65). As a representative of the other ECUs, the GW-ECU determines whether to permit a request from the external tool 2 for communication connection with the ECU 13. The ECUs 13 targeted for communication need not individually perform this determination process. The functions of the ECUs 13 are not duplicated. Costs for the onboard system 1 can be reduced.

The onboard system 1 (GW-ECU 11) uses the public key Pv to perform cryptographic communication with the external tool 2 based on the public key encryption system and acquires the public key Pt ID from the external tool 2 (S62). The onboard system 1 can securely acquire the public key Pt Id for the external tool 2.

The onboard system 1 (GW-ECU 11) itself generates the secret key Sv and the public key Pv (S51). The onboard system 1 stores the secret key Sv in the flash memory 112 (S52) and transmits the public key Pv to the center 3 (S53). After being generated, the secret key Sv need not be exchanged unlike a configuration that generates the secret key Sv using a device other than the onboard system 1 (GW-ECU 11). Confidentiality of the secret key Sv can improve. Transmitting the public key Pv to the center 3 can easily provide the external tool 2 with the public key Pv.

The external tool 2 itself also generates the secret key St and the public key Pt (S11), stores the secret key St in the storage portion 22 (S12), and transmits the public key Pt to the center 3 (S13). Confidentiality of the secret key St can improve unlike a configuration that generates the secret key St using a device other than the external tool 2. The center 3 determines whether the external tool 2 transmitting the public key Pt is authenticated (S34). If the external tool 2 is determined to be authenticated, the center 3 stores the public key Pt and the ID associated with each other (S36). The center 3 can prevent registration of the public key for an unauthenticated external tool.

When transmitting a public key Pt ID to the onboard system 1 (S23), the external tool 2 encrypts the public key Pt ID using the public key Pv paired with the secret key Sv of the onboard system 1. The external tool 2 can securely transmit the public key Pt ID.

The external tool 2 transmits the vehicle specification information to the center 3 (S21). The center 3 receives the vehicle specification information at S21 and transmits the public key Pv associated with the received vehicle specification information to the external tool 2 that transmitted the vehicle specification information (S44). The external tool 2 can easily acquire the public key Pv of the onboard system 1 for connection from the center 3.

The onboard system 1 is equivalent to an example of an onboard system. The GW-ECU 11 is equivalent to a first electronic control unit. The flash memory 112 is equivalent to an example of a storage device. The ECU 13 is equivalent to a second electronic control unit. The onboard wireless device 16 is equivalent to an example of a communication device. The external tool 2 is equivalent to an example of an external tool. The center 3 is equivalent to an example of a server. The secret key Sv is equivalent to an example of a vehicle secret key. The public key Pv is equivalent to an example of a vehicle public key. The secret key St is equivalent to an example of a tool secret key. The public key Pt is equivalent to an example of a tool public key. The common key C is equivalent to an example of a common key.

S11 is equivalent to an example of a tool key generation step. S13 is equivalent to an example of a tool key registration step. S21 is equivalent to an example of a vehicle information transmission step. S23 is equivalent to an example of a tool information transmission step. S25 and S26 are equivalent to an example of a cryptographic communication step.

S32 is equivalent to an example of a vehicle key storage step. S34 is equivalent to an example of a determination step. S36 is equivalent to an example of a tool key storage step. S37 is equivalent to an example of a tool information notification step. S44 is equivalent to an example of a vehicle key transmission step. S46 is equivalent to an example of a tool key transmission step.

S51 is equivalent to an example of a process for a vehicle key generation device and a vehicle key generation step. S52 is equivalent to an example of a process for a storage controller. S53 is equivalent to an example of a process for a vehicle key transmission device and a vehicle key registration step. S62 through S64 are equivalent to an example of a process for a tool key acquisition device. Particularly, S62 is equivalent to an example of a process for a tool information acquisition device. S63 is equivalent to an example of a tool information transmission step. S65 is equivalent to an example of a process for a communication controller and a common key transmission step. S67 is equivalent to an example of a process for an update device and an update step.

5. Other Embodiments

While there has been described the specific preferred embodiment of the present disclosure, it is to be distinctly understood that the present disclosure is not limited thereto but may be otherwise variously embodied within the spirit and scope of the disclosure.

(1) According to the above-mentioned embodiment, the GW-ECU 11 itself generates the secret key Sv and the public key Pv and stores the secret key Sv in the flash memory 112 (S51 and S52). The disclosure is not limited thereto. For example, other apparatuses such as a personal computer and a web server may generate the secret key Sv and store it in the flash memory 112. In this case, the secret key Sv may be exchanged automatically or manually (through a user operation).

(2) According to the above-mentioned embodiment, the external tool 2 itself generates the secret key St and the public key Pt and stores the secret key St in the storage portion 22 (S11 and S12). The disclosure is not limited thereto. For example, other apparatuses such as a personal computer and a web server may generate the secret key St and store it in the storage portion 22. In this case, the secret key St may be exchanged automatically or manually (through a user operation).

(3) According to the above-mentioned embodiment, the external tool 2 has the function to perform wireless communication with the center 3 via the mobile telephone network or the Internet communication network. The disclosure is not limited thereto. The external tool 2 may not have the wireless communication function. In this case, a user of the external tool 2 may exchange information between the external tool 2 and the center 3 using a postal service or other communication devices.

(4) According to the above-mentioned embodiment, the onboard system 1 (in the vehicle) performs the cryptographic communication based on the common key encryption system using the common key C. The disclosure is not limited thereto. No cryptographic communication may be performed in the vehicle.

(5) According to the above-mentioned embodiment, the center 3 is requested from the external tool 2 to transmit the public key Pv of the onboard system 1 (S41). The center 3 transmits the public key Pv if the external tool 2 is determined to be authenticated (YES at S42 and S44). The disclosure is not limited thereto. The public key Pv may be transmitted without the determination. The security is ensured even if an unauthenticated external tool acquires the public key Pv of the onboard system 1. This is because the external tool 2 can perform cryptographic communication with the onboard system 1 using the public key Pt only when the external tool 2 acquires the secret key St paired with the public key Pt registered to the center 3.

(6) According to the above-mentioned embodiment, the GW-ECU 11 is requested from the external tool 2 for communication connection, acquires the public key Pt of the requesting external tool 2 from the center 3 (S63 and S64), and performs cryptographic communication using the public key Pt (S65). The disclosure is not limited thereto. For example, the public key Pt of the requesting external tool 2 may be already stored because of the past communication. In such a case, acquisition of the public key Pt from the center 3 may be omitted. Particularly, transmission of the common key C to the external tool 2 may be omitted using the same common key C as used for the previous communication.

(7) According to the above-mentioned embodiment, the external tool 2 performs wired communication with the onboard system 1 using the connector 17. The disclosure is not limited thereto. For example, an external tool may have the function to perform near field communication with the CAN-BT-ECU 12. Such an external tool can perform a process similar to the above-mentioned embodiment.

The above disclosure has the following aspects.

According to a first aspect of the present disclosure, an in-vehicle system for communicating with an external tool includes: a communication device; a tool key acquisition device; and a communication controller. The in-vehicle system and an external server provide a vehicular communication system. The external tool stores a tool secret key. The external server stores external tool information. The external tool information provides a tool public key and key identification information, which are associated with each other. The tool public key provides a public key, which pairs with the tool secret key. The key identification information provides identification information about the tool public key. The communication device communicates with the server. When the external tool requests communication connection with the in-vehicle system, the tool key acquisition device transmits the key identification information corresponding to the external tool as a request source to the server via the communication device, so that the tool key acquisition device acquires the tool public key associated with the key identification information from the server via the communication device. The communication controller performs cryptographic communication with the external tool as the request source with using the tool public key acquired by the tool key acquisition device.

The above in-vehicle system performs cryptographic communication with the external tool using the tool public key stored (registered) in the server. An external tool used for the cryptographic communication can be limited to the external tool that stores the tool secret key paired with the tool public key. For example, an external tool may improperly access identification information about the tool public key stored (registered) in the server that does not store (register) the tool public key of the external tool. Even in such a case, a failure to acquire the tool secret key disables the cryptographic communication using the tool public key. Only the authenticated external tool can register its tool public key to the server and prevent an unauthenticated external tool from making communication connection with the in-vehicle system.

Alternatively, the communication controller may perform the cryptographic communication with the external tool in a public key cryptosystem using the tool public key, so that the communication controller shares a common key with the external tool. The common key provides cryptographic communication in a common key cryptosystem. In this case, after the common key is shared, the vehicular communication system can perform cryptographic communication based on the common key encryption system with a decreased processing load instead of cryptographic communication based on the public key encryption system.

Alternatively, the in-vehicle system may further include: an update device for updating the common key. In this case, the vehicular communication system can provide higher security than a configuration that does not update the common key.

Further, the update device may update the common key, each time the external tool and the in-vehicle system complete the cryptographic communication in the common key cryptosystem. In this case, the security can be particularly improved because a different common key is used each time cryptographic communication is performed between the external tool and the in-vehicle system based on the common key encryption system.

Alternatively, the update device may generate a updated common key based on vehicle information. In this case, the common key can vary with the vehicle information.

Suppose that the in-vehicle system includes more than one electronic control unit that can each connect with the external tool. In such a case, each electronic control unit may include the tool key acquisition device and the communication controller. Alternatively, the in-vehicle system may further include: a first electronic control unit for directly communicating with the external tool; and a second electronic control unit for communicating with the external tool through the first electronic control unit. The first electronic control unit includes the tool key acquisition device and the communication controller. In this case, the in-vehicle system according to this configuration can prevent the electronic control units from duplicating their functions compared to the configuration that provides each electronic control unit with the tool key acquisition device and the communication controller.

Alternatively, the in-vehicle system may further include: a storage device for storing a vehicle secret key as a secret key of the in-vehicle system. The tool key acquisition device includes a tool information acquisition device that performs cryptographic communication with the external tool in a public key cryptosystem using a vehicle public key, which pairs with the vehicle secret key so that the tool information acquisition device acquires the key identification information about the external tool from the external tool. In this case, this in-vehicle system can securely acquire key identification information about the external tool.

Alternatively, the in-vehicle system may further include: a vehicle key generation device that generates the vehicle secret key and the vehicle public key; a storage controller that controls the storage device to store the vehicle secret key generated by the vehicle key generation device; and a vehicle key transmission device that transmits the vehicle public key generated by the vehicle key generation device to the server. In this case, this in-vehicle system can securely store the vehicle secret key compared to a configuration that generates the vehicle secret key using a device other than the in-vehicle system. In addition, transmitting the vehicle public key to the server can easily provide the external tool with the vehicle public key.

According to a second aspect of the present disclosure, a method for communicating between an in-vehicle system and an external tool includes: transmitting key identification information from the external tool to the in-vehicle system, wherein the key identification information provides identification information about a tool public key of the external tool; transmitting the key identification information from the in-vehicle system to a server, wherein the server stores the tool public key and key identification information about the tool public key, which are associated with each other; transmitting the tool public key from the server to the in-vehicle system, wherein the tool public key is associated with the key identification information received by the server, transmitting a common key from the in-vehicle system to the external tool, wherein the common key is encrypted using the tool public key received by the in-vehicle system; decrypting an encrypted common key received by the external tool using a tool secret key, which pairs with the tool public key of the external tool; and performing cryptographic communication with the in-vehicle system using the common key.

In the above method, the tool public key stored (registered) in the server is used to encrypt the common key. The in-vehicle system transmits the common key to the external tool to share the common key. The in-vehicle system may perform cryptographic communication using the common key with the external tool. In such a case, the in-vehicle system can limit the targeted external tool to the one that stores a tool secret key paired with the tool public key. For example, an external tool may improperly access identification information about the tool public key stored (registered) in the server that does not store (register) the tool public key of the external tool. Even in such a case, a failure to acquire the tool secret key disables the cryptographic communication (decrypting the encrypted common key) using the tool public key. Cryptographic communication using the common key is unavailable. Only the authenticated external tool can register its tool public key to the server and prevent an unauthenticated external tool from making communication connection with the in-vehicle system. After the common key is shared, the vehicular communication system can perform cryptographic communication based on the common key encryption system with a decreased processing load instead of cryptographic communication based on the public key encryption system.

Alternatively, the method may further include: updating the common key with using the in-vehicle system after the cryptographic communication is completed. In this case, the vehicular communication system can provide higher security than a configuration that does not update the common key.

Alternatively, the method may further include: generating the tool secret key and the tool public key of the external tool; transmitting the tool public key and tool specification information from the external tool to the server, wherein the tool specification information specifies the external tool; checking the tool specification information with using the server to determine whether the external tool that has transmitted the tool specification information is authenticated; storing the tool public key and the key identification information in the server when it is determined that the external tool that has transmitted the tool specification information is authenticated, wherein the key identification information is assigned to the tool public key so that the key identification information and the tool public key are associated with each other; and transmitting the key identification information from the server to the external tool as a transmission source when it is determined that the external tool that has transmitted the tool specification information is authenticated. In this case, the server can store (register) the public key for an authenticated external tool and provide the key identification information. The server can prevent storage (registration) of the public key for an unauthenticated external tool.

Alternatively, in the transmitting of the key identification information from the external tool to the in-vehicle system, the key identification information may be encrypted with a vehicle public key, which pairs with a vehicle secret key of the in-vehicle system, and an encrypted key identification information is transmitted from the external tool to the in-vehicle system. In the transmitting of the key identification information from the in-vehicle system to the server, the in-vehicle system decrypts the encrypted key identification information, and a decrypted key identification information is transmitted from the in-vehicle system to the server. In this case, the external tool can securely transmit the key identification information about the external tool to the onboard system.

Alternatively, the communication method may further include: generating the vehicle secret key and the vehicle public key of the in-vehicle system with using the in-vehicle system; transmitting the vehicle public key and the vehicle specification information from the in-vehicle system to the server, wherein the vehicle public key is generated in the generating of the vehicle secret key and the vehicle public key, and the vehicle specification information specifies the in-vehicle system; storing the vehicle public key and the vehicle specification information, which are associated with each other, in the server, wherein the vehicle public key and the vehicle specification information are received by the server in the transmitting of the vehicle public key and the vehicle specification, information; transmitting the vehicle specification information from the external tool to the server; and transmitting the vehicle public key from the server to the external tool as a transmission source of the vehicle specification information, wherein the vehicle public key is associated with the vehicle specification information, which is received by the server in the transmitting of the vehicle specification information. In this case, the external tool can acquire the public key for the in-vehicle system from the server.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle system for communicating with an external tool, the system comprising:
   a communication device; and
   a tool key acquisition electronic control unit
   wherein the tool key acquisition electronic control unit includes a communication controller,
   wherein the in-vehicle system and an external server provide a vehicular communication system,
   wherein the external tool stores a tool secret key,
   wherein the external server stores external tool information,
   wherein the external tool information provides a tool public key and key identification information, which are associated with each other,
   wherein the tool public key provides a public key, which pairs with the tool secret key,
   wherein the key identification information provides identification information about the tool public key,
   wherein the communication device communicates with the external server,
   wherein, when the external tool requests communication connection with the in-vehicle system, the tool key acquisition electronic control unit transmits the key identification information corresponding to the external tool as a request source to the external server via the communication device, so that the tool key acquisition electronic control unit acquires the tool public key associated with the key identification information from the external server via the communication device,
   wherein the tool key acquisition electronic control unit is connected to a plurality of other electronic control units via a bus,
   wherein the communication controller performs cryptographic communication between the external tool as the request source of a communication connection and the plurality of other electronic control units with using the tool public key acquired by the tool key acquisition electronic control unit,
   wherein the tool key acquisition electronic control unit stores a common key,
   wherein the communication controller performs the cryptographic communication with the external tool in a public key cryptosystem using the tool public key, so that the tool key acquisition electronic control unit is configured to encrypt the common key using the tool public key, and is configured to transmit the common key to the external tool,
   wherein the communication controller shares the common key with the external tool, and
   wherein the common key provides cryptographic communication in a common key crypto system,
   the system further comprising:
   an update device for updating the common key,
   wherein the update device updates the common key, each time the external tool and the in-vehicle system complete the cryptographic communication in the common key cryptosystem.

2. The in-vehicle system according to claim 1,
   wherein the update device generates a updated common key based on vehicle information.

3. The in-vehicle system according to claim 2, wherein the common key and the updated common key vary with the vehicle information.

4. The in-vehicle system according to claim 1 further comprising:
a first electronic control unit for directly communicating with the external tool; and
a second electronic control unit for communicating with the external tool through the first electronic control unit,
wherein the first electronic control unit includes the tool key acquisition electronic control unit and the communication controller.

5. The in-vehicle system according to claim 1 further comprising:
a storage device for storing a vehicle secret key as a secret key of the in-vehicle system,
wherein the tool key acquisition electronic control unit includes a tool information acquisition device that performs cryptographic communication with the external tool in a public key cryptosystem using a vehicle public key, which pairs with the vehicle secret key so that the tool information acquisition device acquires the key identification information about the external tool from the external tool.

6. The in-vehicle system according to claim 5 further comprising:
a vehicle key generation device that generates the vehicle secret key and the vehicle public key;
a storage controller that controls the storage device to store the vehicle secret key generated by the vehicle key generation device; and
a vehicle key transmission device that transmits the vehicle public key generated by the vehicle key generation device to the external server.

7. The in-vehicle system according to claim 1,
wherein the common key is different from the public key.

8. The in-vehicle system according to claim 1,
wherein the communication device and the tool key acquisition electronic control unit are both located in a vehicle.

9. A method for communicating between an in-vehicle system and an external tool comprising:
transmitting key identification information from the external tool to the in-vehicle system, wherein the key identification information provides identification information about a tool public key of the external tool;
transmitting the key identification information from the in-vehicle system to an external server using a tool key acquisition electronic control unit in the in-vehicle system, wherein the external server stores the tool public key and key identification information about the tool public key, which are associated with each other;
transmitting the tool public key from the external server to the in-vehicle system and receiving the tool public key using the tool key acquisition electronic control unit, wherein the tool public key is associated with the key identification information received by the external server;
transmitting a common key from the in-vehicle system to the external tool, wherein the common key is encrypted using the tool public key received by the tool key acquisition electronic control unit;
decrypting an encrypted common key received by the external tool using a tool secret key, which pairs with the tool public key of the external tool, wherein the tool key acquisition electronic control unit shares the common key with the external tool; and
performing cryptographic communication between the external tool and a plurality of other electronic control units in the in-vehicle system using the common key,
wherein the tool key acquisition electronic control unit is connected to the plurality of other electronic control units via a bus,
the method further comprising:
updating the common key using the in-vehicle system after the cryptographic communication is completed,
wherein the updating of the common key is performed each time the cryptographic communication between the external tool and the in-vehicle system is completed.

10. The method according to claim 9 further comprising:
generating the tool secret key and the tool public key of the external tool;
transmitting the tool public key and tool specification information from the external tool to the external server, wherein the tool specification information specifies the external tool;
checking the tool specification information with using the external server to determine whether the external tool that has transmitted the tool specification information is authenticated;
storing the tool public key and the key identification information in the external server when it is determined that the external tool that has transmitted the tool specification information is authenticated, wherein the key identification information is assigned to the tool public key so that the key identification information and the tool public key are associated with each other; and
transmitting the key identification information from the external server to the external tool as a transmission source when it is determined that the external tool that has transmitted the tool specification information is authenticated.

11. The method according to claim 9,
wherein, in the transmitting of the key identification information from the external tool to the in-vehicle system, the key identification information is encrypted with a vehicle public key, which pairs with a vehicle secret key of the in-vehicle system, and an encrypted key identification information is transmitted from the external tool to the in-vehicle system, and
wherein, in the transmitting of the key identification information from the in-vehicle system to the external server, the in-vehicle system decrypts the encrypted key identification information, and a decrypted key identification information is transmitted from the in-vehicle system to the external server.

12. The method according to claim 11 further comprising:
generating the vehicle secret key and the vehicle public key of the in-vehicle system with using the in-vehicle system;
transmitting the vehicle public key and the vehicle specification information from the in-vehicle system to the external server, wherein the vehicle public key is generated in the generating of the vehicle secret key and the vehicle public key, and the vehicle specification information specifies the in-vehicle system;
storing the vehicle public key and the vehicle specification information, which are associated with each other, in the external server, wherein the vehicle public key and the vehicle specification information are received by the external server in the transmitting of the vehicle public key and the vehicle specification information;

transmitting the vehicle specification information from the external tool to the external server; and transmitting the vehicle public key from the external server to the external tool as a transmission source of the vehicle specification information, wherein the vehicle public key is associated with the vehicle specification information, which is received by the external server in the transmitting of the vehicle specification information.

13. The method according to claim 9, wherein the updating of the common key using the in-vehicle system includes discarding the common key at the external tool, generating a new common key at the in-vehicle system, and transmitting the new common key from the in-vehicle system to the external tool, the new common key being encrypted using the tool public key.

14. The method according to claim 9, wherein the common key is different from the tool public key.

* * * * *